United States Patent
Yang

(10) Patent No.: US 11,665,755 B2
(45) Date of Patent: May 30, 2023

(54) PEER-TO-PEER COMMUNICATION AMONG END USER DEVICES

(71) Applicant: Zhenbang Yang, Hangzhou (CN)

(72) Inventor: Zhenbang Yang, Hangzhou (CN)

(73) Assignee: Zhenbang Yang, Hangzhou (CN)

( * ) Notice: Subject to any disclaimer, the term of this patent is extended or adjusted under 35 U.S.C. 154(b) by 18 days.

(21) Appl. No.: 16/875,001

(22) Filed: May 15, 2020

(65) Prior Publication Data

US 2021/0360716 A1  Nov. 18, 2021

(51) Int. Cl.
| | |
|---|---|
| *H04L 29/06* | (2006.01) |
| *H04W 76/14* | (2018.01) |
| *H04W 4/70* | (2018.01) |
| *H04L 69/164* | (2022.01) |
| *H04W 80/06* | (2009.01) |
| *H04L 61/5014* | (2022.01) |

(52) U.S. Cl.
CPC ......... *H04W 76/14* (2018.02); *H04L 61/5014* (2022.05); *H04L 69/164* (2013.01); *H04W 4/70* (2018.02); *H04W 80/06* (2013.01)

(58) Field of Classification Search
CPC ..... H04L 43/08; H04L 67/104; H04L 67/148; H04L 69/16; H04L 65/4015; H04L 65/403; H04L 67/42; G06Q 10/101; G06Q 50/01
See application file for complete search history.

(56) References Cited

U.S. PATENT DOCUMENTS

| | | | | |
|---|---|---|---|---|
| 2007/0049258 A1* | 3/2007 | Thibeault | ............... | H04L 51/58 |
| | | | | 455/414.1 |
| 2007/0073878 A1* | 3/2007 | Issa | ............. | H04L 67/1063 |
| | | | | 709/225 |
| 2008/0002698 A1* | 1/2008 | Pantalone | ............... | H04W 4/14 |
| | | | | 370/392 |
| 2011/0252151 A1 | 10/2011 | Lu et al. | | |
| 2012/0036193 A1 | 2/2012 | Abuan et al. | | |
| 2012/0259988 A1* | 10/2012 | Erringer | ............... | H04L 67/104 |
| | | | | 709/228 |
| 2012/0331073 A1 | 12/2012 | Williams | | |
| 2014/0331478 A1 | 11/2014 | Joseph et al. | | |
| 2015/0319203 A1* | 11/2015 | Jeremias | ............... | H04L 51/222 |
| | | | | 715/753 |

FOREIGN PATENT DOCUMENTS

EP  2475145 A1  7/2012

OTHER PUBLICATIONS

International Searching Authority, International Search Report and Written Opinion for International Application No. PCT/IB2021/054155 dated Jul. 2, 2021.

* cited by examiner

*Primary Examiner* — Mansour Oveissi
(74) *Attorney, Agent, or Firm* — Rimon PC

(57) ABSTRACT

Methods and apparatus are disclosed for facilitating peer-to-peer end user communication without exposing user data to $3^{rd}$-party servers. In an exemplary embodiment, a $3^{rd}$-party server facilitates establishment of a peer-to-peer connection between two end user devices or among a group session. After the establishment of a peer-to-peer connection, data transfer takes place directly between end user devices without the data being stored at or routed through the $3^{rd}$-party server.

28 Claims, 18 Drawing Sheets

PEER-TO-PEER COMMUNICATION AMONG END USER DEVICES

TECHNICAL FIELD

The present disclosure relates generally to network communications technology, and more specifically to peer-to-peer communication among user devices.

BACKGROUND

Internet applications, such as World Wide Web, email, file transfer, group chat, rely on Internet Protocol (IP). The Transmission Control Protocol (TCP) and the User Datagram Protocol (UDP) are two of the main transport layer protocols in the IP protocol stack. TCP provides reliable, ordered, and error-checked delivery of data between applications running on hosts communicating via an IP network. Applications that do not require reliable data delivery may use UDP, which provides a connectionless data transport that emphasizes reduced latency over reliability. There could be many different types of physical networks underlying the transport layer protocols, TCP and UDP, for example, Ethernet, Wireless, FDDI (fiber distributed data interface), and ATM (asynchronous transfer mode).

Due to the rapid growth of the Internet and the ensuing exhaustion of IP addresses, most Internet users are assigned dynamic IP addresses that may change frequently. Therefore, most users cannot initiate peer-to-peer connections directly among themselves for lack of knowledge of each other's IP address. They must rely on $3^{rd}$-party servers with static public IP addresses to help establish indirect communications. Specifically, an end user device with a dynamic public IP address first establishes a TCP connection to a $3^{rd}$-party server with a static public IP address, and then communicates with another end user device through the $3^{rd}$-party server. Data exchanged between end user devices are stored and forwarded by the $3^{rd}$-party server. The $3^{rd}$-party server serves as a data communication intermediary for the end user devices.

As these $3^{rd}$-party servers become increasingly more centralized and are amassing more and more user data, private user data are at the risk of censorship, monopoly, theft, and leaks. End users' data privacy is often threatened.

As such, there is a need for more effective methods to facilitate peer-to-peer end user communication on the Internet without exposing user data to $3^{rd}$-party servers.

SUMMARY

Methods and apparatus are disclosed for facilitating peer-to-peer end user communications on the Internet without exposing user data to $3^{rd}$-party servers. In some embodiments, a method of facilitating, by a server, establishment of a peer-to-peer connection between a first device and a second device comprises first establishing a first connection between the server and the first device and establishing a second connection between the server and the second device. The method further comprises receiving a first IP address of the first device via the first connection and sending the first IP address to the second device via the second connection. The first IP address of the first device is used by the second device to establish a peer-to-peer connection between the first device and the second device.

In some embodiments, the first IP address of the first device comprises a dynamic IP address of the first device and a port number of the dynamic IP address. In some embodiments, the first connection is a TCP connection. In one embodiment, a UDP connection is established between the first device and the server in addition to the TCP connection. In other embodiments, the first connection is a UDP connection.

In some embodiments, the sending of the first IP address to the second device via the second connection comprises sending the first IP address of the first device to the second device upon receiving a request from the first device to make a peer-to-peer connection with the second device.

In some embodiments, the method of facilitating peer-to-peer connections between end user devices further comprises receiving a second IP address of the second device via the second connection and sending the second IP address to the first device via the first connection. Further, the method may comprise establishing a third connection between the server and a third device and receiving a third IP address of the third device via the third connection. In some embodiments, the first, second, and third IP addresses are sent, by the server, to each of the first, second, and third devices to allow each of the devices to establish a peer-to-peer connection with another device.

In some embodiments, the server receives an indication of the peer-to-peer connection between the first device and the second device and sends the peer-to-peer connection to other devices to allow the other devices to join. In one embodiment, the indication of the peer-to-peer connection between the first device and the second device comprises the IP address of the first device and the IP address of the second device.

In some embodiments, information about the peer-to-peer connection between the first device and the second device may be sent by either the first device or the second device to another user device to allow the other user device to join the peer-to-peer connection. In one embodiment, the information about the peer-to-peer connection may be sent via an invitation.

In one embodiment, the first device and the second device disconnect the first and second connection with the server after the peer-to-peer connection between the first and second devices has been established. In another embodiment, the server disconnects the first and second connection after the peer-to-peer connection between the first and second devices has been established.

The present application also discloses a server configured to facilitate establishing a peer-to-peer connection between a first device and a second device. The server comprises one or more processors and a network communication device configured to transmit and receive data over an IP network. The one or more processors are configured to establish a first connection between the server and the first device, establish a second connection between the server and the second device, receive a first IP address of the first device via the first connection, and send the first IP address to the second device via the second connection, The first IP address of the first device is used by the second device to establish a peer-to-peer connection between the first device and the second device.

In some embodiments, the first IP address of the first device comprises a dynamic IP address of the first device and a port number of the dynamic IP address. In one embodiment, the first connection is a TCP connection. In one embodiment, a UDP connection may be established between the first device and the server in addition to the TCP connection.

The first connection may be a UDP connection.

In some embodiments, the processors are configured to send the first IP address of the first device to the second device upon receiving a request from the first device to make a peer-to-peer connection with the second device. The processors may be further configured to receive a second IP address of the second device via the second connection and send the second IP address to the first device via the first connection. In some embodiments, the processor may further establish a third connection between the server and a third device and receive a third IP address of the third device via the third connection. The server may send the first, second, and third IP addresses to each of the first, second, and third devices to allow each of the devices to establish a peer-to-peer connection with another device.

In some embodiments, the processors are configured to receive an indication of the peer-to-peer connection between the first device and the second device and send the peer-to-peer connection to other devices to allow the other devices to join. The indication of the peer-to-peer connection may comprise the IP address of the first device and the IP address of the second device. The first and/or second connection may be disconnected, simultaneously or in sequence, after the peer-to-peer connection between the first and second devices has been established. The connections may be disconnected by the devices or by the server.

In some embodiments, a device is configured to establishing a peer-to-peer connection with another device. The device comprises one or more processors and a network communication card for transmitting and receiving data over an IP network. The processors are configured to establish a connection with a server, send a first IP address of the device to the server, receive a second IP address of the other device from the server, and send a connection request to the other device using the received second IP address to establish a peer-to-peer connection.

In some embodiments, the processors are further configured to receive a third IP address of a third device from the server and send a connection request to the third device using the received third IP address. The processors may send an indication of the established peer-to-peer connection between the first device and the second device to the third device and/or other devices. The processors may receive an indication of a peer-to-peer connection between two other devices and send a connection request to one or both of the other two devices to form a group chat session. The processors may send a disconnect request to the server to disconnect the connection between the end device and the server. The processors may disconnect the connection upon receiving a disconnect request.

In some embodiments, a method of establishing, by a first device, a peer-to-peer connection between the first device and a second device comprises establishing a connection with a server, sending a first IP address of the first device to the server, receiving a second IP address of the second device from the server, and sending a connection request to the second device using the received second IP address to establish a peer-to-peer connection. In some embodiments, the method may further comprise receiving a third IP address of a third device from the server and sending a connection request to the third device using the received third IP address.

In some embodiments, a method of establishing, by a first device, a peer-to-peer connection between the first device and a second device comprises establishing a connection with a server, sending a first IP address of the first device to the server, receiving a connection request from a second device and accepting the connection request to establish a peer-to-peer connection. The method further comprises receiving a connection request from the third device and accepting the connection request to establish a peer-to-peer connection with the third device.

In some embodiments, the method further comprises sending an indication of the established peer-to-peer connection to other devices. The method may further comprise receiving an indication of a peer-to-peer connection between two other devices and sending a connection request to one or both of the other two devices to form a group chat session. Afterwards, the method may include sending a disconnect request to the server to disconnect the first device from the server. Alternatively, the method may include disconnecting, by the first device, the connection between the first device and the server.

In one embodiment, a first end user device sends its dynamic IP address and its port number to a $3^{rd}$-party server. A second end user device makes a request to the server to communicate peer-to-peer with the first device. The server sends the first device's IP address and port number to the second device. The second device attempts to make a connection to the IP address and port number of the first device. A direct connection can then be established for peer-to-peer communications between the first device and the second device. Data transfer takes place between the two devices without being stored and forwarded by the server. In some implementations the server sends the second device's IP address to the first device for approval before providing the first device's IP address and port number to the second device. In some implementations the first device uses the second device's IP address to authenticate connection requests from the second device. In some implementations the first device only creates the port number for peer-to-peer communications upon request from another end user device.

In some embodiments a third device makes a request to the server to join the first and second device for a group session. The server sends the first device's IP address and port number and the second device's IP address and port number to the third device. The third device makes a connection to the first device's IP address and port number and makes a connection to the second device's IP address and port number. A group session is now established for peer-to-peer communications among the first device, the second device, and third device.

In some embodiments the end user devices inform the server of peer-to-peer data transfer without disclosing its content. In some embodiments after the establishment of a peer-to-peer connection or a group session, the end user devices disconnect from the server so that their peer-to-peer communications become completely independent from the $3^{rd}$-party server.

Of course, the present invention is not limited to the features, advantages, and contexts summarized above, and those familiar with storage technologies will recognize additional features and advantages upon reading the following detailed description and upon viewing the accompanying drawings.

BRIEF DESCRIPTION OF THE DRAWINGS

These and other features of the present disclosure will become readily apparent upon further review of the following specification and drawings. In the drawings, like reference numerals designate like parts having similar functionality throughout the views. Like parts may be designed differently in different embodiments. Components in the drawings are not necessarily drawn to scale, the emphasis instead being placed upon clearly illustrating the principles of the present disclosure.

DETAILED DESCRIPTION

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
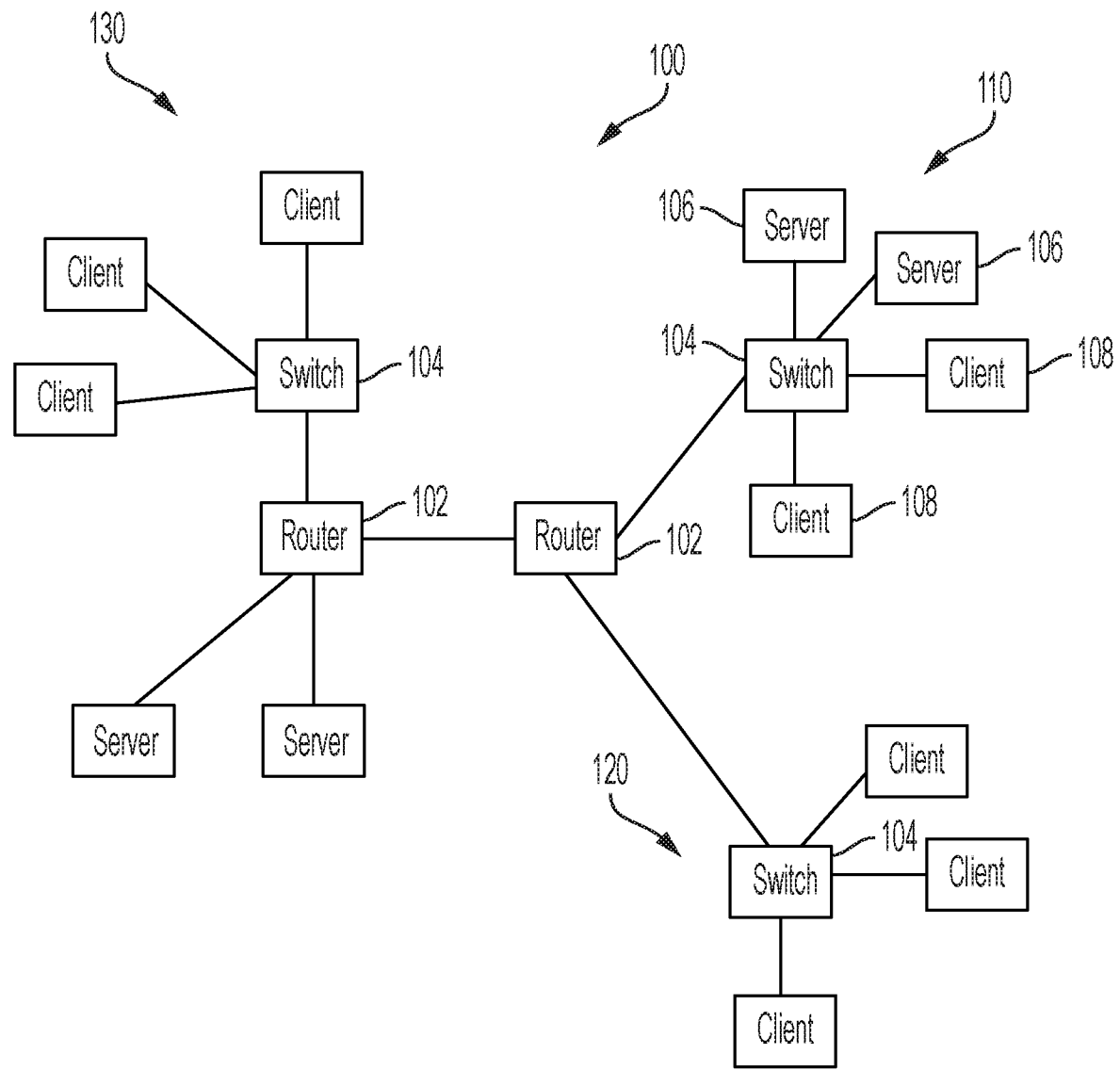
FIG. 1 illustrates an exemplary network comprising several interconnected local area networks.

In referring to FIG. 1, an IP network 100 comprises a plurality of devices inter-connected via wired or wireless connections. Among the plurality of devices, there are routers 102, switches 104, servers 106, and clients 108. Routers 102 are networking devices connecting two computer networks. For example, the IP network 100 comprises three networks 110, 120, and 130. Routers 102 are configured to forward data packets received from one network, e.g. network 110, to another network, e.g., network 120. Switches 104 are networking devices that connect other devices on a network and enable communication between these other devices by forwarding data from a source device to a destination device. In FIG. 1, the servers 106 and the clients 108 are devices that implement a distributed application paradigm. In a typical client-server application architecture, a server is a computing machine configured to run an application to serve the requests from clients. The server and its clients can be located on the same or different physical machines. Examples of a server include webhost server, DHCP servers, etc.

A DHCP server is configured to provide a dynamic IP address to a client upon receiving a request from the client. The IP address is dynamic because it is temporarily assigned by the DHCP server to the client upon request and the address will be returned to a pool when it is released by the client. Dynamic IP addresses are created to solve the IP address shortage problem caused by an explosive increase of the number of networking devices.

Figure 2:
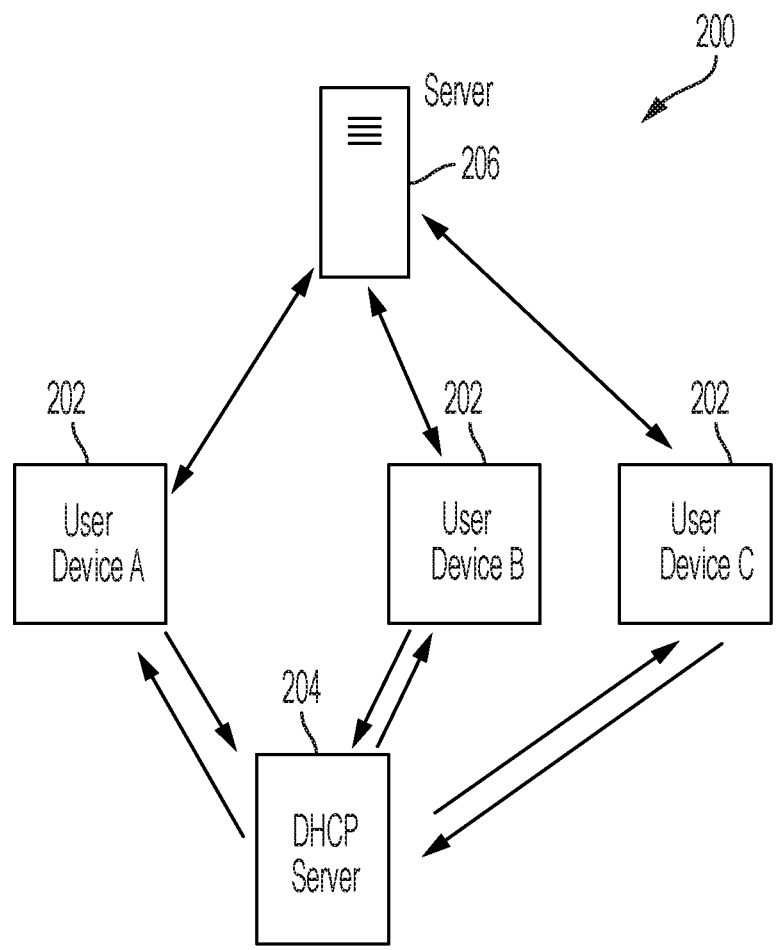
FIG. 2 illustrates a system in which user devices obtain dynamic IP addresses from a dynamic host configuration protocol (DHCP) server.

FIG. 2 illustrates a system 200 that comprises end user device A, user device B, and user device C, 202, a DHCP server 204 and a server 206. The end user devices 202 are configured to obtain a dynamic IP address from the DHCP server 204 before communicating with the webhost server 206. After acquiring a temporary IP address, an end user device 202 can then send data requests to the server 206. The data requests would include the temporary IP address acquired by the end user device 202 for the server 206 to return the requested data. Generally, an end user device does not have a permanent IP address and relies on a DHCP server to acquire a temporary IP address before it can communicate with other devices on the network. After a session is finished, the client relinquishes the temporary IP address and the DHCP server returns the temporary IP address to a pool for reuse in the future. An end user device cannot initiate communication with another end user due to lack of knowledge of the other end user device's temporary IP address. For example, the user device A 202 can send data to or receive data from the end user device B 202 only through the server 206 because only the server 206 has the knowledge of the temporary IP addresses assigned to the user devices 202. Because all user data need to go through the server 206 and possibly are being stored on the server 206, private user data are exposed to the risk of theft, censorship, or control perpetrated at the server 206.

The present application discloses advanced methods and apparatus for user devices 202 to build peer-to-peer connections for direct communication without going through a server. Peer-to-peer connections allow user data to be transferred between user devices 202 without being routed through the server 206, reducing or eliminating the risk of exposing private user data to third parties.

Figure 3:
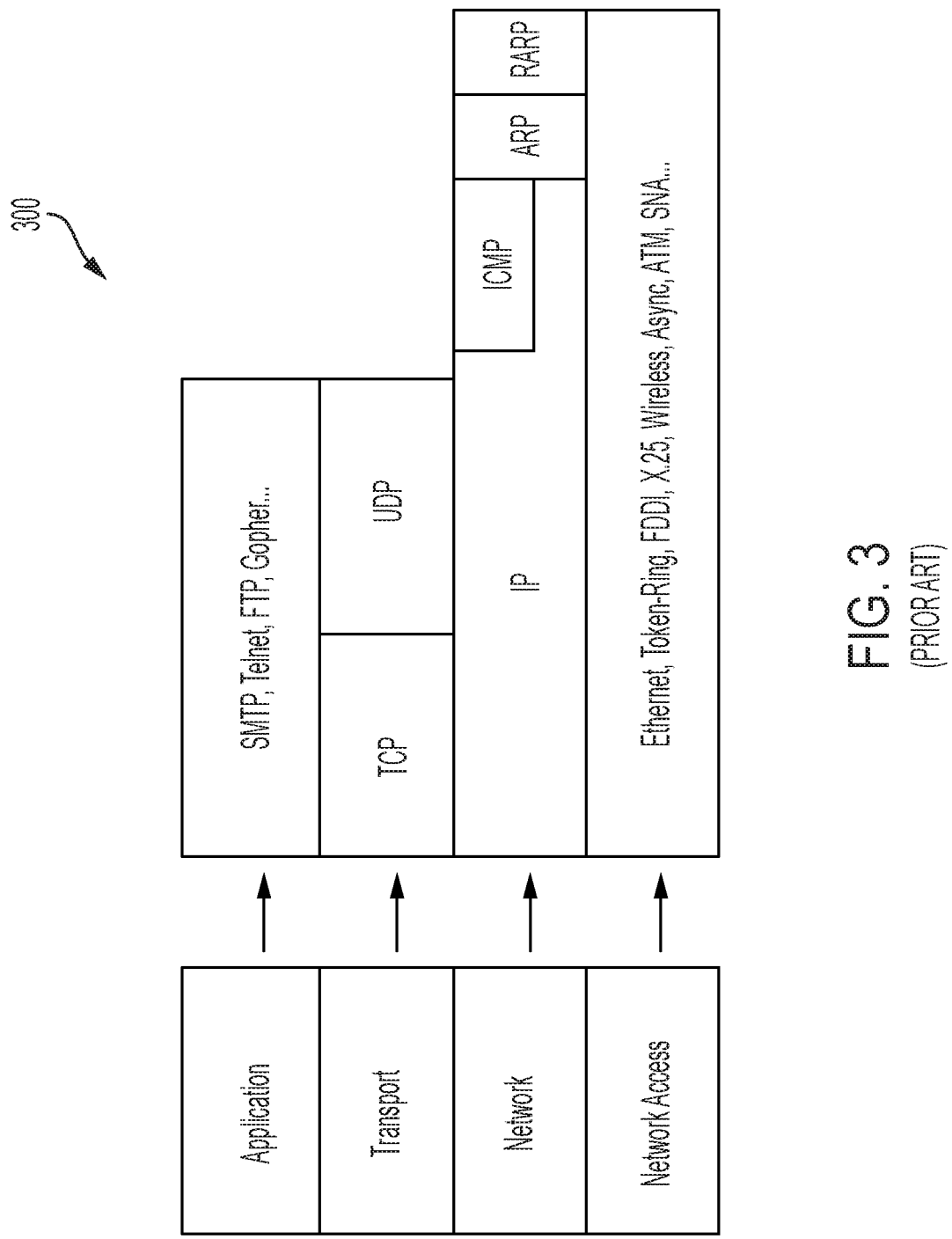
FIG. 3 is an illustrative diagram of various internet protocols.

In the following descriptions, TCP protocol and UDP protocol are used as examples to illustrate the inventive methods and apparatus disclosed herein. However, a person skilled in the art would readily understand that other protocols, IP or non-IP, can replace or supplement the TCP and UDP protocols in the examples described below. For background information, FIG. 3 is a diagram illustrating a network communication protocol stack 300, which comprises four protocol layers: link layer (also known as network access layer or network interface layer), network layer, transport layer, and application layer. The link layer normally includes the device driver in the operating system and the corresponding network interface card of the device. For example, Ethernet, ATM, Wireless, etc., are in this layer. The network layer handles the movement of packets around the network. IP, ICMP (Internet Control Message Protocol), ARP (address resolution protocol), RARP (reverse address resolution protocol) etc., are in the network layer. The transport layer provides dataflows between two devices. TCP and UDP protocols are in the transport layer. The application layer handles the details of a particular application. For example, FTP (file transfer protocol), SNMP (simple network management protocol), etc. are in the application layer. In the embodiments described below, the methods and apparatus are implemented in the application layer, utilizing underlying TCP and/or UDP to transfer data over an IP network.

Figure 4:
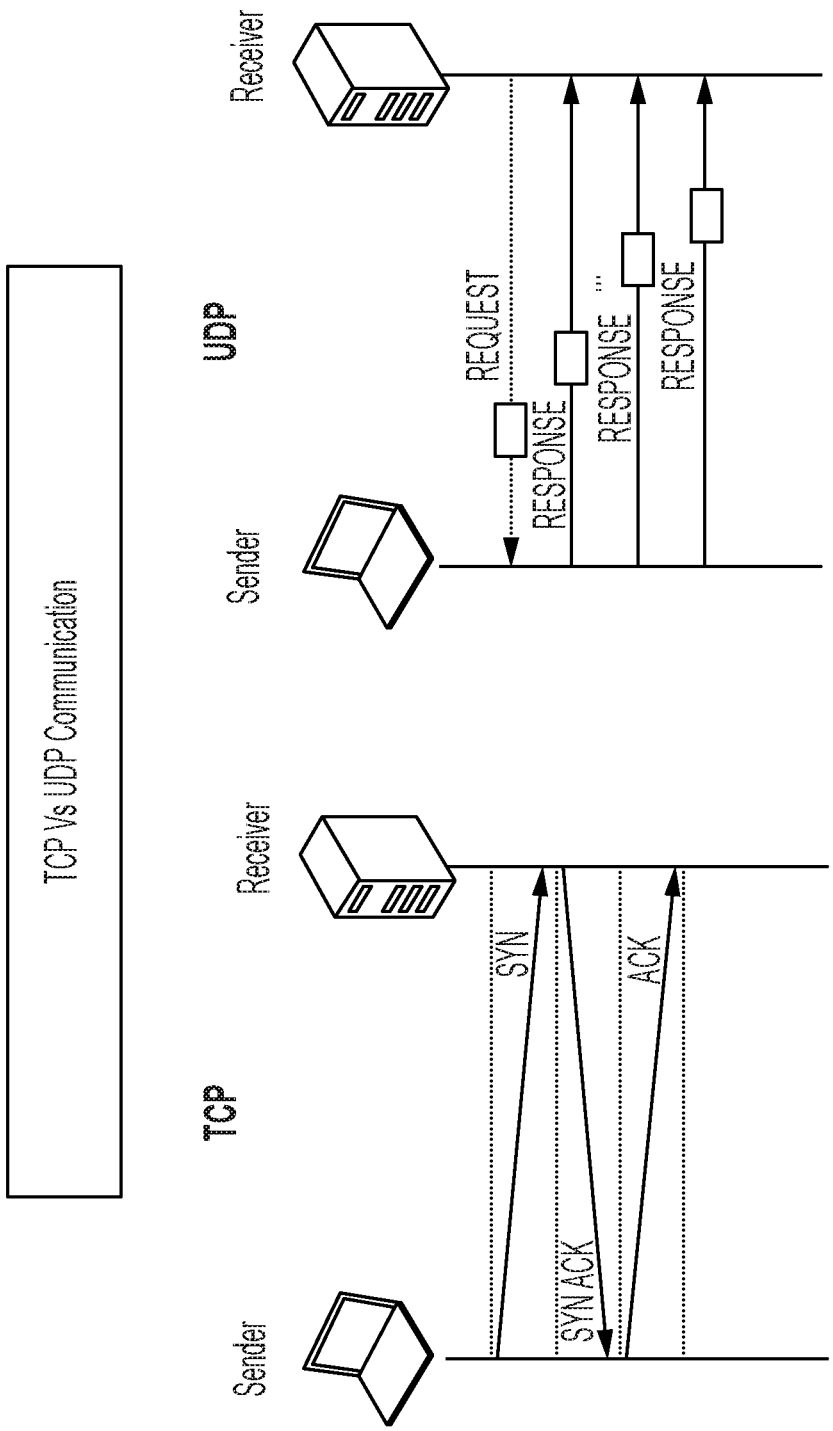
FIG. 4 is a diagram comparing the TCP and UDP protocols.

TCP and UDP are two different network layer protocols. FIG. 4 illustrates the differences between them. TCP provides a reliable flow of data between two hosts, for example, a sender and a receiver. TCP is said to be a connection-oriented protocol. Before the two hosts can send data, a TCP connection must be established. The left diagram of FIG. 4 shows a process of two hosts synchronizing sequence numbers of data packages for data transmission. In TCP protocol, when the sender sends a data package of a sequence number to the receiver, it waits for an acknowledgement from the receiver that the data package of that sequence number has been safely received. If the sender fails to receive an acknowledgement for the data package with a particular sequence number from the receiver, it will attempt sending that data package again. The sender may be configured to re-try a preconfigured number of times before determining that the connection is lost.

UDP, on the other hand, provides a much simpler service to an application in the application layer, as compared to TCP. When using UDP protocol, a sender sends packets of data called datagrams. UDP does not guarantee that the datagrams reach the receiver. Although UDP is not as reliable as TCP, any desired reliability can be added by functions implemented in the application. In the right diagram of FIG. 4, the data communication is conducted in UDP. When the receiver sends a request for data to the sender, the sender responds with the requested data. Because a UDP datagram is limited by a maximum data size, e.g., 65507 bytes, the sender breaks the requested data into multiple datagrams and send the datagrams to the receiver in multiple responses.

Both TCP and UDP identify an application in the application layer using a 16-bit port number. Some port numbers are well-known and reserved for specific applications or specific purposes. Some port numbers are called ephemeral ports that are usually used by clients temporarily for only the duration during which a service is needed.

In FIG. 4, the data transmissions are between two host machines, a sender and a receiver. However, as explained above, data transmissions over IP protocol are generally between a server and a client. Two clients, often residing on end user devices, cannot exchange data directly without going through a server. The present application discloses novel methods and apparatus designed to allow peer-to-peer data transfer between two end user devices.

Figure 5A:
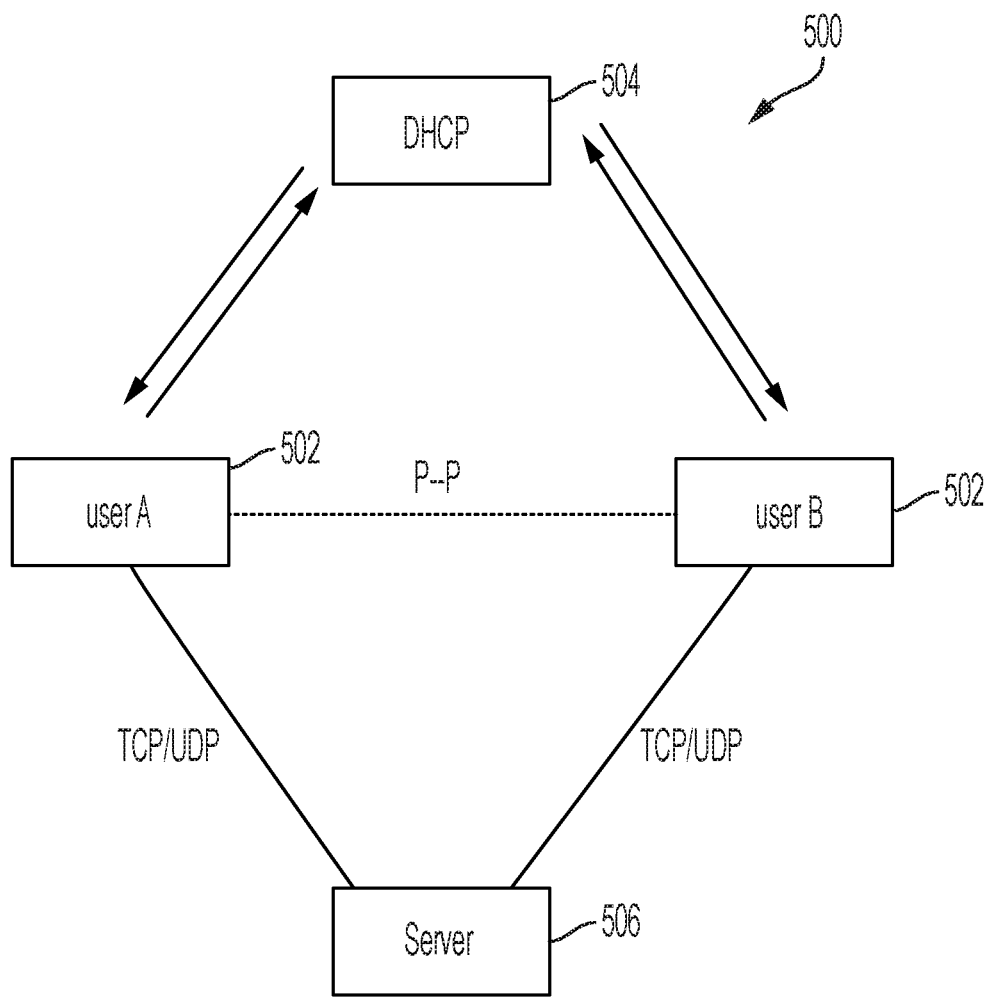
FIGS. 5A-5B illustrate an embodiment in which a peer-to-peer connection is established between two user devices.

FIG. 5A illustrates a first embodiment of establishing a peer-to-peer connection between two end user devices. In the system 500 of FIG. 5, user devices A and B 502 are connected to a server 506 and a DHCP server 504. It is noted that although the DHCP server 504 and the server 506 are shown to be separate entities, they may reside on the same or different machines. The user devices 502 each acquire a dynamic IP address from the DHCP server 504. Generally, the server 506 is configured with a static IP address that is known to the user devices 502. Each user device uses the server's IP address to initiate communication with the server 506, for example, as a client sending a request to a server. In some embodiments, the user devices 502 each establish a TCP connection with the server 506. In some embodiments, the user devices 502 may establish a UDP connection with the server 506. In one embodiment, the user devices 502 may establish both a TCP and a UDP connection with the server 506. To facilitate communication with the server 506, the user devices 502 will first send their dynamic IP addresses to the server 506. After acquiring the dynamic IP addresses of the user devices 502, the server 506 can send the acquired dynamic IP addresses to other user devices 502, either upon request, approval, or automatically, based on the application configuration.

In some embodiments, the user device A 502 may send a request to the server 506 asking for the user device B 502's dynamic IP address. Upon approval or consent by the user device B 502, the server 506 sends the user device B 502's dynamic IP address to the user device A 502. The approval from the user device B 502 may be given explicitly after receiving an inquiry from the server 506. In some embodiments, the approval from the user device 506B may be indicated in a system parameter that is set when the peer-to-peer application is first installed on the user device B 502. In some embodiments, the server 506 stores a list of the user devices that have consented to IP address sharing.

In some embodiments, after receiving the dynamic IP address of the user device B 502, the user device A 502 sends a UDP datagram to the user device B 502. The header of the UDP datagram includes the IP address of the user device A 502 as the source address, which can be used by the user device B 502 to send return datagrams. The data connection between the user devices A and B 502 is now established for the two user devices to conduct peer-to-peer communication. The peer-to-peer communication can be carried out with or without evolvement of the server 506.

Figure 5B:
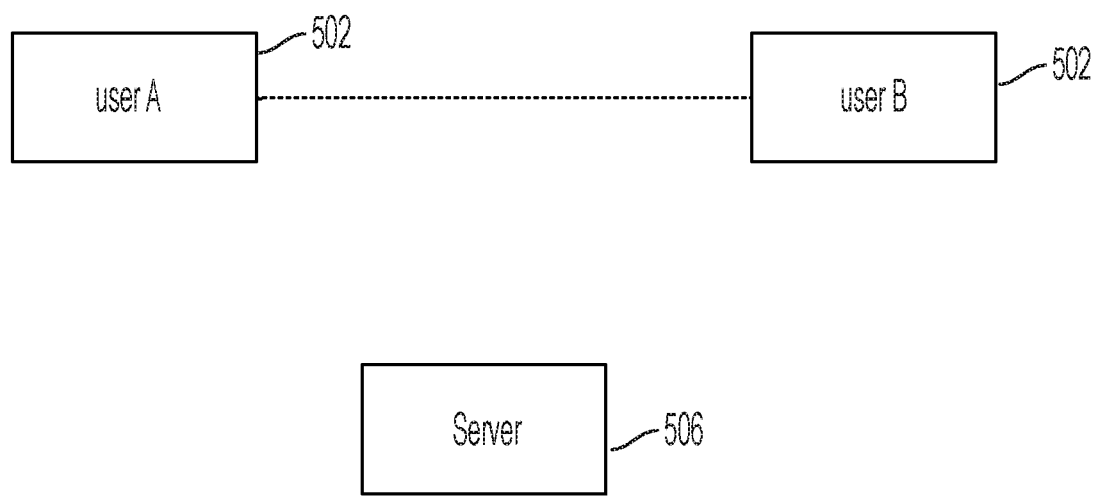

After the peer-to-peer connection is established between the user devices A and B 502, the user devices A and B 502 may choose to disconnect their connections with the server 506, as shown in FIG. 5B. The connection between the user devices A and B 502 becomes private and the data exchanged between them does not involve the server 506 and it not exposed to any third party.

The IP connection between a user device and a server may be disconnected in different ways. The detailed steps may depend on the type of connections, TCP v. UDP, or other protocols. The details may also be application specific, for example, depending on whether the server or the user device initiates the disconnection. A person ordinarily skilled in the art would be familiar with the technical details involved in implementing the steps of how to disconnect an IP connection.

The peer-to-peer connections can be established among a plurality of user devices. FIGS. 6A-6B and FIGS. 7A-7B show respectively three and four user devices establishing a group chat session using peer-to-peer connections.

Figure 6A:
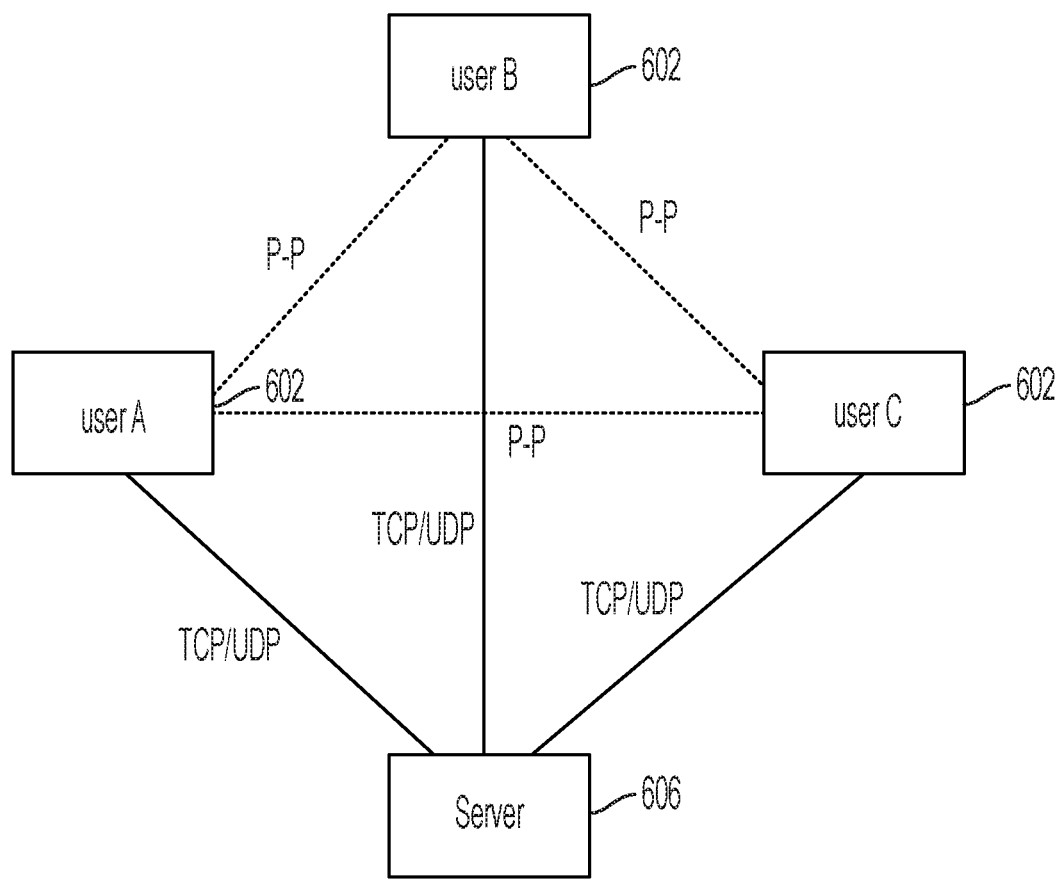
FIGS. 6A-6B illustrate an embodiment in which peer-to-peer connections are established among three user devices.

In FIG. 6A, the user devices A, B, and C 602 first establish an IP (TCP and/or UDP) connection with the server 606. In that process, the user devices 602 each acquire a dynamic IP address from a DHCP server and use the dynamic IP addresses to establish the connection with the server 606. Any one of the three user devices 602 may initiate a group chat session with the other two user devices. How a user device 602 initiates the group chat session is implementation dependent.

In a first implementation, two user devices may first establish a peer-to-peer connection between themselves and then invite a third user device to join the two-way session to form a group session.

In a second implementation, a first user device may first establish a peer-to-peer connection with the second and the third user devices respectively using the process shown in FIG. 5A and FIG. 5B. The first user device is in possession of the knowledge of the other two devices' IP addresses. The first user device can share the IP address of the second device with the third device or that of the third device with the second device. With the other device's IP address, the second or the third device can establish peer-to-peer connection between themselves.

In a third implementation, the server 606 may be managing all user devices 602's IP addresses. Upon receiving a request from one of the user devices 602 to establishing a group chat session among the user devices A, B, and C 602, the server 606 sends the IP addresses of the user devices to all three user devices. The three user devices can then establish peer-to-peer connections with each other.

Other implementation variations are feasible, and the descriptions herein are not exhaustive.

Figure 6B:
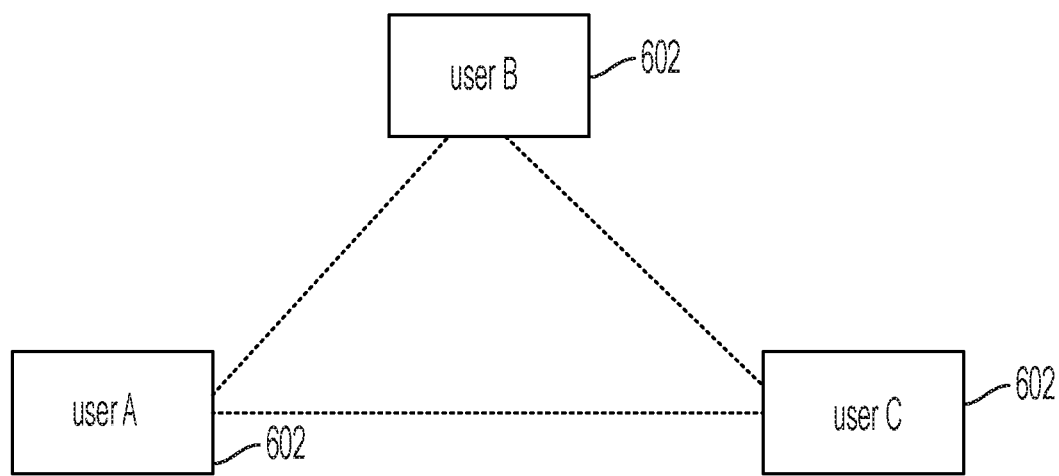

In FIG. 6B, after the three user devices A, B, and C 602 have established peer-to-peer connections among themselves, the user devices disconnect their IP connection with the server 606, to make the group session private.

Figure 7A:
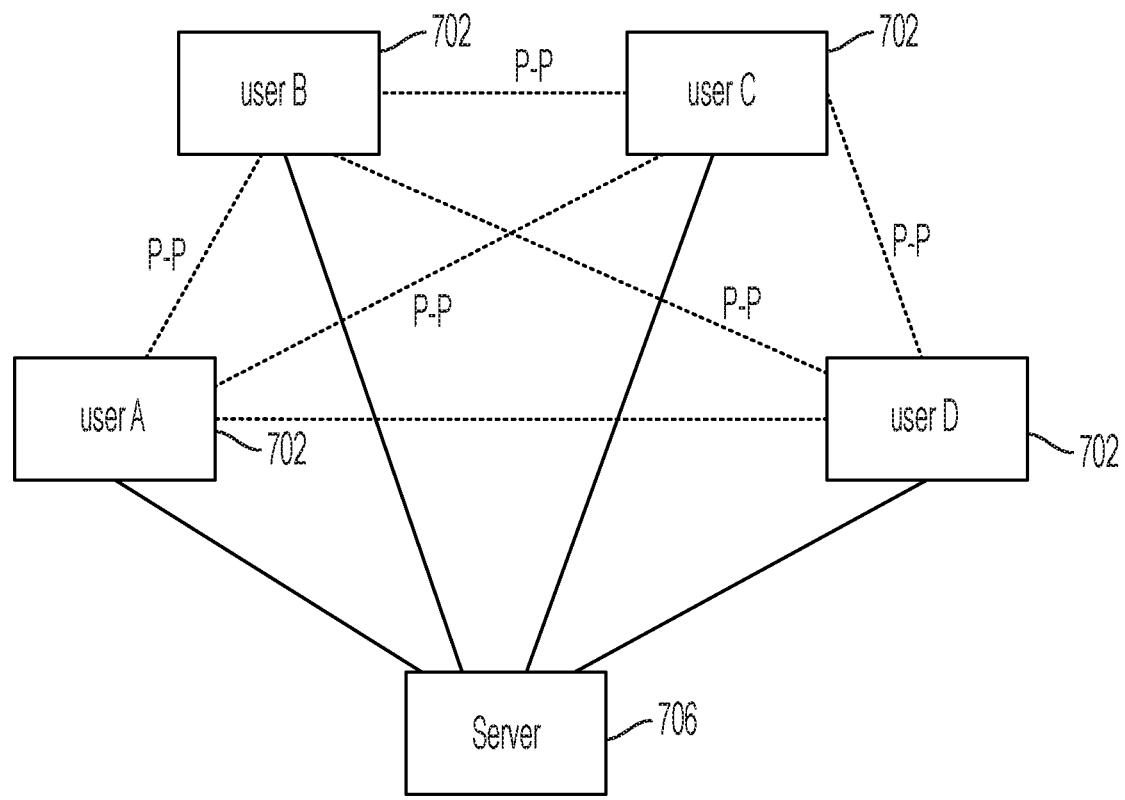
FIGS. 7A-7B illustrate an embodiment for four user devices to establish a peer-to-peer connection.
Figure 7B:
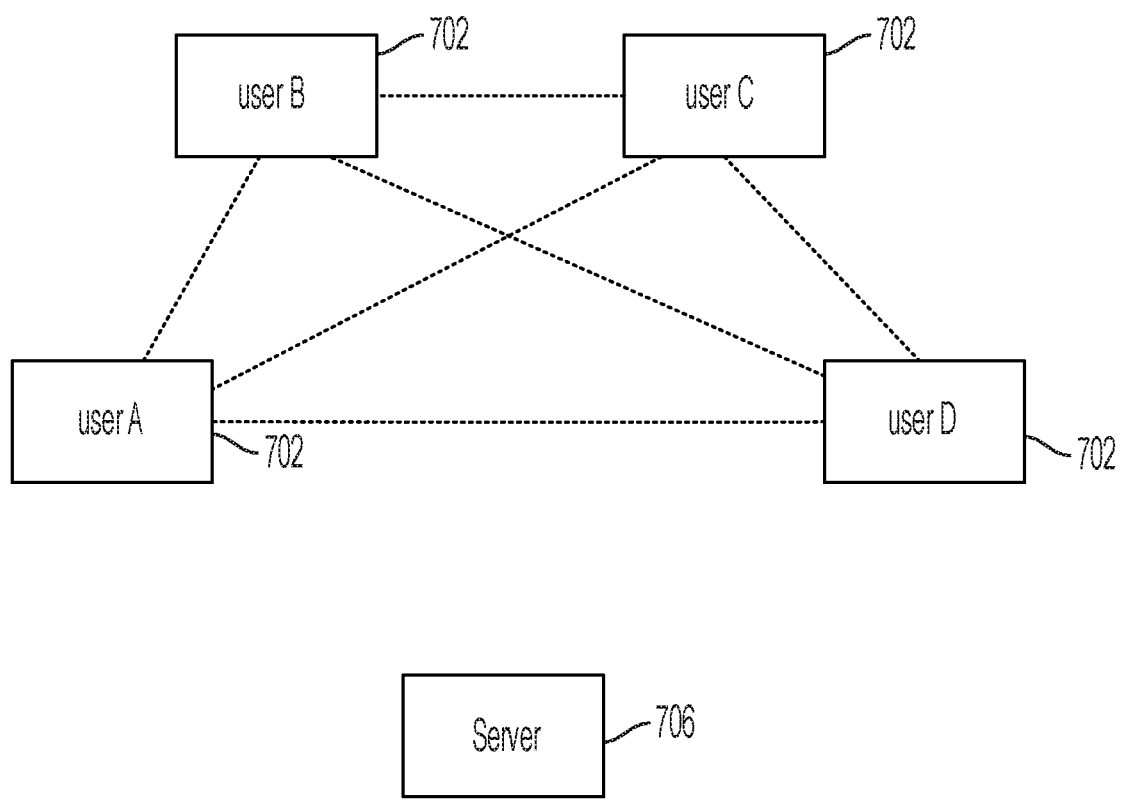

FIG. 7A and FIG. 7B illustrate the process in which four user devices 702 establish a private group chat session. In FIG. 7A, each of the user devices 702 first establishes an IP connection with the server 706. The server 706 then facilitates the exchange of IP addresses among the user devices 702. As described above, the exchange of IP addresses among the user devices can be implemented in different manners and the details are not repeated here.

After the user devices A, B, C, and D 702 have established peer-to-peer connections among themselves, they can disconnect their IP connections with the server 706, to make a private group chat session among themselves, as shown in FIG. 7B.

Figure 8:
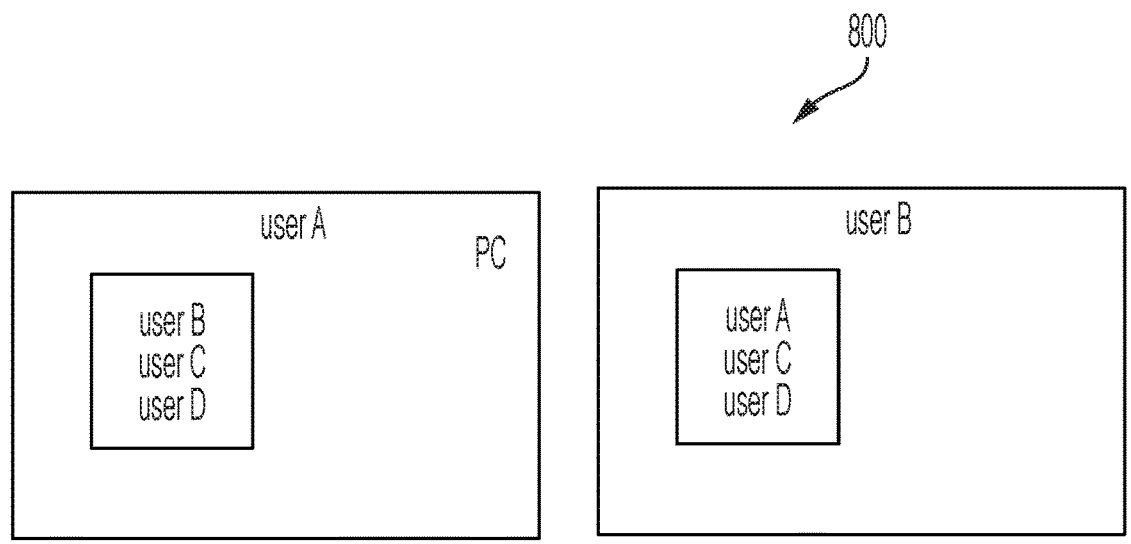
FIG. 8 illustrate an exemplary graphic user interface for displaying user devices that are available for peer-to-peer connection.

In some implementations, a group chat application facilitates and controls the establishment of a group chat sessions among the user devices. The group chat application installed on a user device may present a user interface 800 as shown in FIG. 8. The user interface 800 lists the user devices that are available for group chat. How to create such a list is implementation specific and different methods can be used to generate such list. For example, in one embodiment, the group chat application of the user device A queries the server and obtains from the server a list of dynamic IP addresses. The dynamic IP addresses on the list belong to user devices that have indicated to the server they are available for group chat sessions.

In another embodiment, the group chat application of the user device A queries the server and obtains from the server a list of dynamic IP addresses. This list includes all user devices on the network that are known to the server. Some of the user devices on the list may be unavailable or unwilling to join a group chat. To start a group chat session, the user on the user device A selects one device from the list, say, user device B, and sends a group chat invitation to user device B. The user device B, if it is available for group chat, will accept the invitation. If it is not available, the user device B will reject the invitation.

Other implementations of the group chat application are possible. For example, when a first user device learns of the dynamic IP address of a second user device, the first user device can start communicating with the second user device using the second user device's dynamic IP address. Once the peer-to-peer connection between the first and second user devices is established, the user devices may choose to disconnect from the server, making their chat session private. For another example, a group chat session among three or more user devices can be established in different methods. For example, each of the plurality of user devices first establishes a peer-to-peer connection with another user device while maintaining the connection with the server.

After each of the plurality of user devices is inter-connected with every other user device, the plurality of user devices disconnects the connection with the server, making the group chat session among the plurality of user devices private. These methods are illustrated in FIGS. 5A-5B, FIGS. 6A-6B, and FIGS. 7A-7B.

Figure 9A:
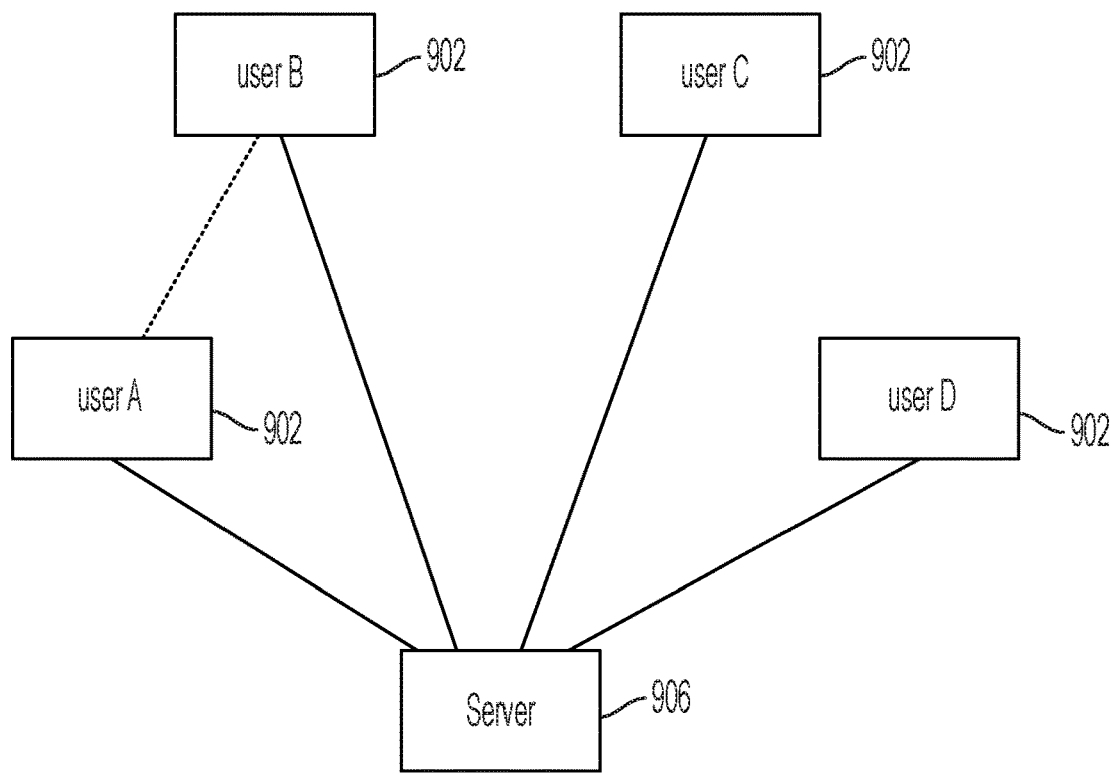
FIGS. 9A-9E illustrate an exemplary process of joining a private group chat by a user device.
Figure 9B:
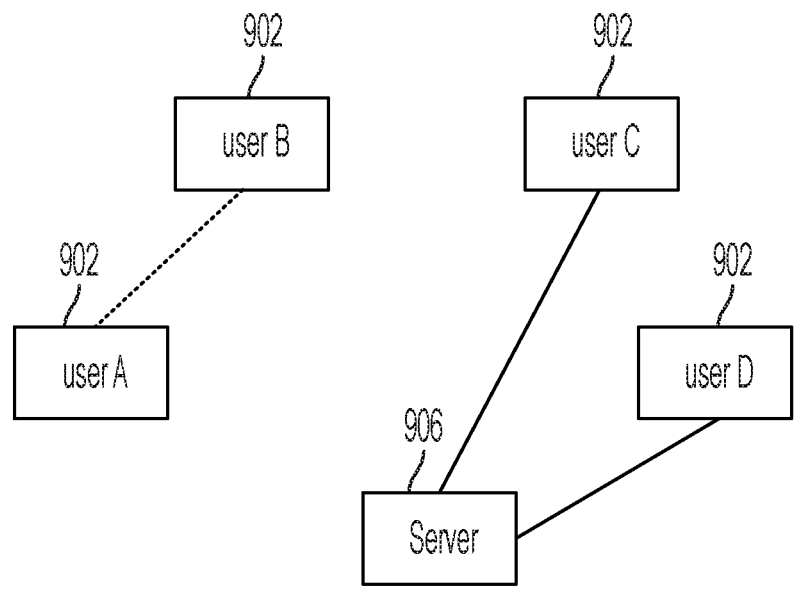

FIGS. 9A-9E illustrate a set of different steps for establishing a private group chat session among the user devices A-D 902. In FIG. 9A, the server 906 is connected with four user devices A-D 902. The user device A 902 obtains the dynamic IP address of the user device B 902 and establishes a peer-to-peer connection with the user device B 902. After the establishment of the peer-to-peer connection, the user device A and B 902 disconnect from the server 906A as shown in FIG. 9B.

Figure 9C:
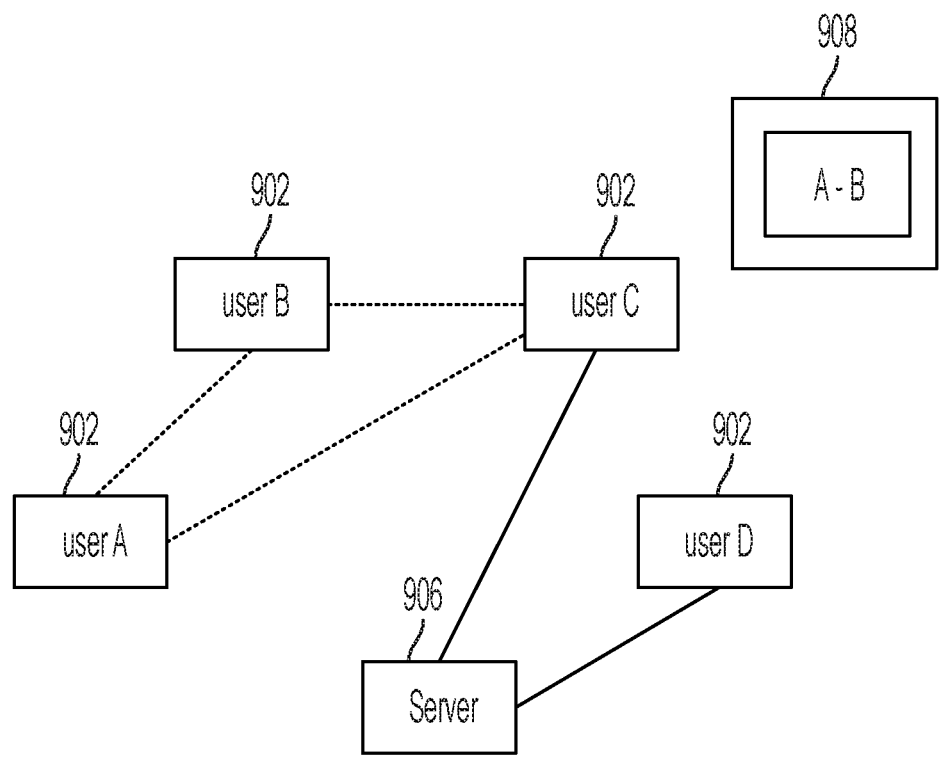
Figure 9D:
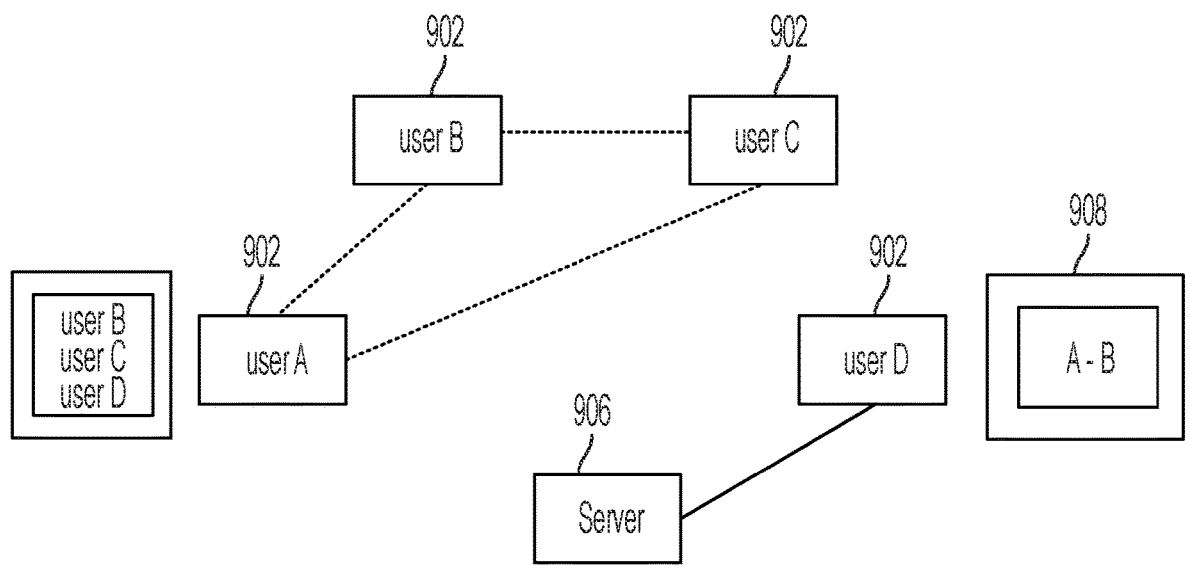

The private chat session is listed on the user interface 908 of the group chat application of the user device C 902 and the user device D 902 as shown in FIG. 9C. In one embodiment, the user device C 902 initiates a peer-to-peer connection request to both the user device A 902 and the user device B 902 to join their private chat. After the request is accepted by both user devices, the user device C 902 becomes part of the group chat session, as shown in FIG. 9C. The user device C 902 disconnects its connection with the server 906 as shown in FIG. 9D to make the group chat session among the user devices A-C 902 private. It is noted that, in some embodiments, the user device C 902 is required to disconnect from the server 906 when its peer-to-peer connection with the user device A and B 902 is established. In some embodiments, the user device C 902 may be required to disconnect from the server 906 before its peer-to-peer connection with the user device A and B 902 is established. This is feasible because the user device C 902 has already acquired the dynamic IP address of the user device A and B 902 before its connection with the server is disconnected. FIG. 9D shows an embodiment in which a user device joins an already established chat session. In FIG. 9D, the user device C 902 that is not part of the chat session requests admission to the chat session among the user devices A-C 902.

Figure 9E:
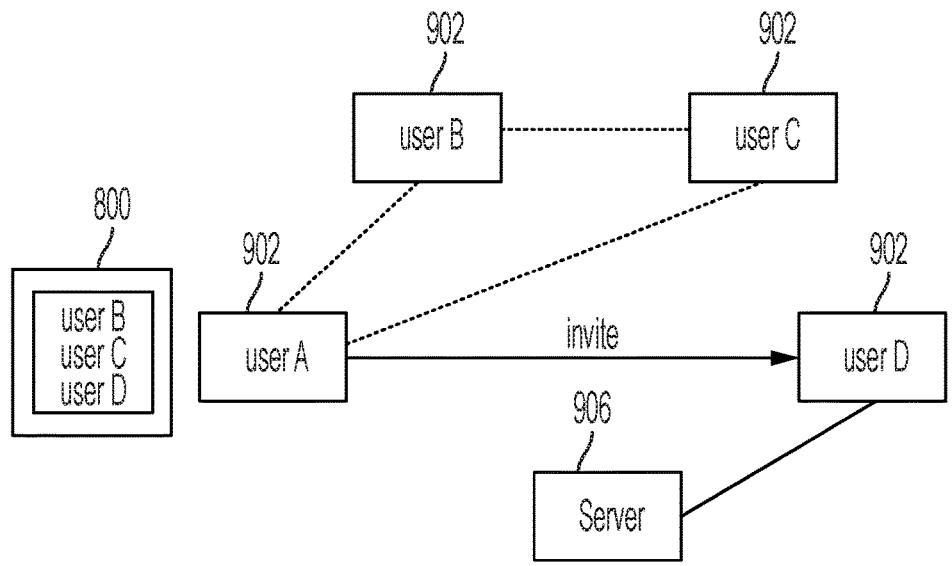

FIG. 9E illustrates a second embodiment in which a new user device can be added to an existing private group chat session. In FIG. 9E, the private group chat session between user devices A-C 902 is already established. The user device A 902 maintains a list of devices of known IP addresses, as shown in the interface 800. The user device A 902 selects user device D 902 from the list and sends a group chat invitation to the user device D 902 to invite it to join the private group chat session. In the invitation, the IP addresses of the chat session members may be included. In one implementation, the user device A 902 may send the IP addresses of the chat session members to the user device D 902 after the invitation has been accepted. In a yet another implementation, after accepting the invitation, the user device D 902 may send a request to the chat session members that is listed in the invitation. The private group chat session among the user devices A-D 902 is established when the peer-to-peer connection between the user device D 902 and the other three user devices is set up and the connections between the server 906 and the user devices A-D 902 are disconnected (not shown).

To establish a private group chat session, the connection between any of the user devices involved in the group chat session and the server should be severed or cut-off. To be more specific, in some embodiments, the connection between a user device and a server may refer to an entire communication link, for example, IP connection, wireless connection, etc. In other embodiments, the connection may refer to an application-level connection, i.e., the connection established by the group chat application.

Using IP connection as an example, the following description illustrates how a user device and/or server disconnects the TCP/UDP connection between them.

A TCP connection between the user device A 202 and the server 200 is full-duplex and data can be flowing between the two in each direction independently of the other direction. During disconnection, each direction must be shut down independently. In one scenario, the user device A 202 first issues the close segment to perform the active close. The server 200 receives the close segment, sends back an acknowledgement, and performs the passive close. This closes the data flow from the user device A 202 to the server 200 and it is called a half close. The other half, the data flow from the server 200 to the user device A 202, can be closed similarly. Normally, either end, user device or server, can actively close the connection. In the group chat application, user devices may often be the end that actively closes the connection.

When there is a UDP connection between the user device A 202 and the server 200, either on top of the TCP connection or functioning as the only IP connection, the UDP connection can be disconnected by closing the UDP socket. Strictly speaking, there is no UDP connection because UDP is not connection-based. In this application, "UDP connection" refers to a two-way message transfer between two devices, for example, a user device and a server. When the user device A 202 decides to close its UDP data communication with the server 200, the user device A 202 can simply close its UDP socket.

One embodiment of such UDP connection is the so-called keep-alive UDP packets used on top of a TCP connection. Generally, the keep-alive feature can be implemented to monitor the network connection with the other end. UDP packets are used as keep-alive messages. When the user device A 202 sends a keep-alive message but does not receive an acknowledgement, the user device A 202 considers the network connection down.

In some implementations, the keep-alive feature can be turned on or off at the user device A 202. When in a normal or regular group chat session, if the server 200 is still connected with the user devices engaged in the chat session, the user device 202 can rely on the server to monitor and reconnect with other user devices. The keep-alive messages are not used to monitor the network connection. On the other hand, in a private group chat session, because the connections between the server 200 and the user devices A and B 202 are severed, the keep-alive messages can be used to monitor user devices' connection with other user devices. When a connection between two user devices 202 is down or lost, the user devices 202 can reattempt to establish the connection again, possibly without involving the server 206. However, a problem may arise if the user devices' dynamic IP addresses are returned to the DHCP server 204 and are being reused. In such case, connection between the user devices can be restored by connecting to the server 206.

Figure 10A:
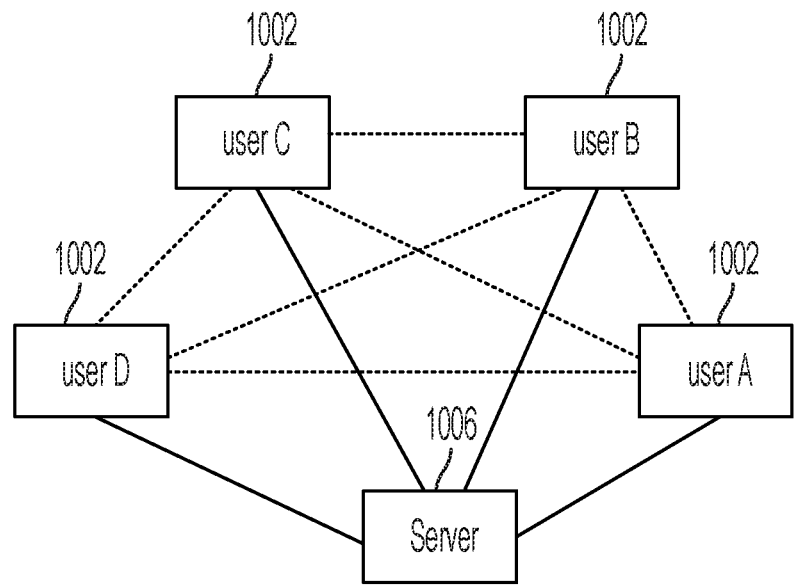
FIGS. 10A-10C illustrate an embodiment of establishing a private group chat session.
Figure 10B:
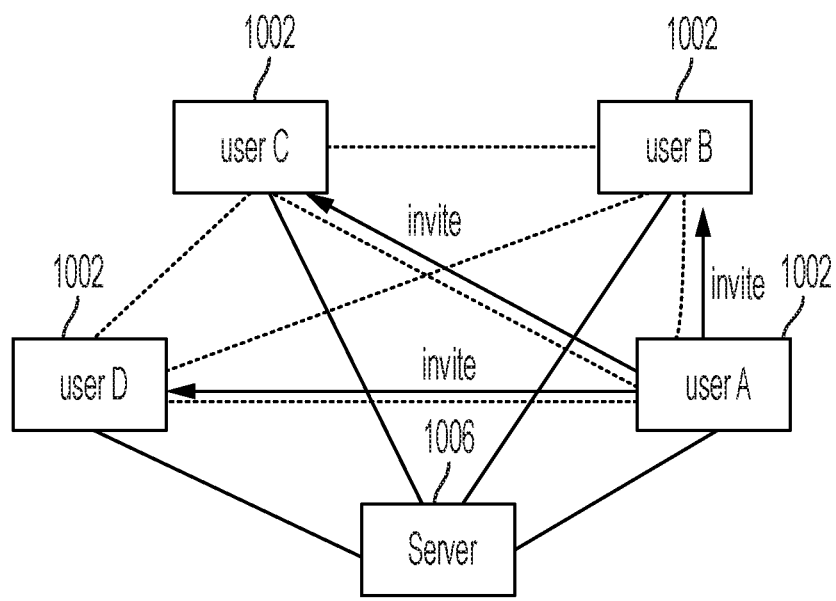
Figure 10C:
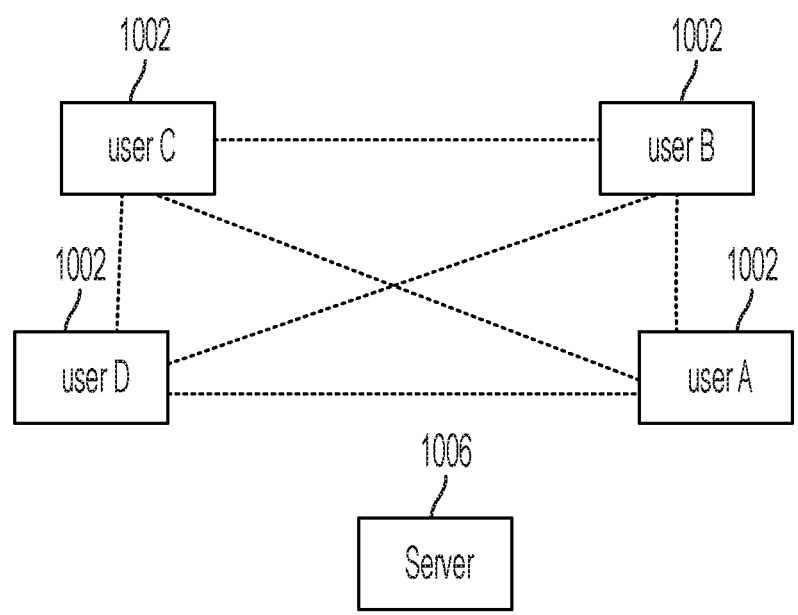

FIGS. 10A-10C illustrates one implementation in which different user devices disconnect from the server in a concerted manner. In FIG. 10A, the user devices A-D 1002 are inter-connected with each other and are also connected to the server 1006. At this time, the user devices A-D 1002 have peer-to-peer connections and can chat with each other. To make the chat session private, the user device A 1002 sends an invite to each of the other user devices for a private group chat session. Upon acceptance of the invite, the user devices B-D 1002 severs their connections with the server 1006 and the group chat session becomes private.

It is noted that the invitation sent by one user device A 1002 to make the group chat private may be implemented as an invitation to a private group session. Alternatively, the invitation may be implemented as a request to other user devices to disconnect from the server 1006. The purpose of sending a message from one user device to the other user devices is to make sure all connections between the user devices and the server are disconnected. The group chat is not truly private if one or more use devices are still connected to the server.

Figure 11:
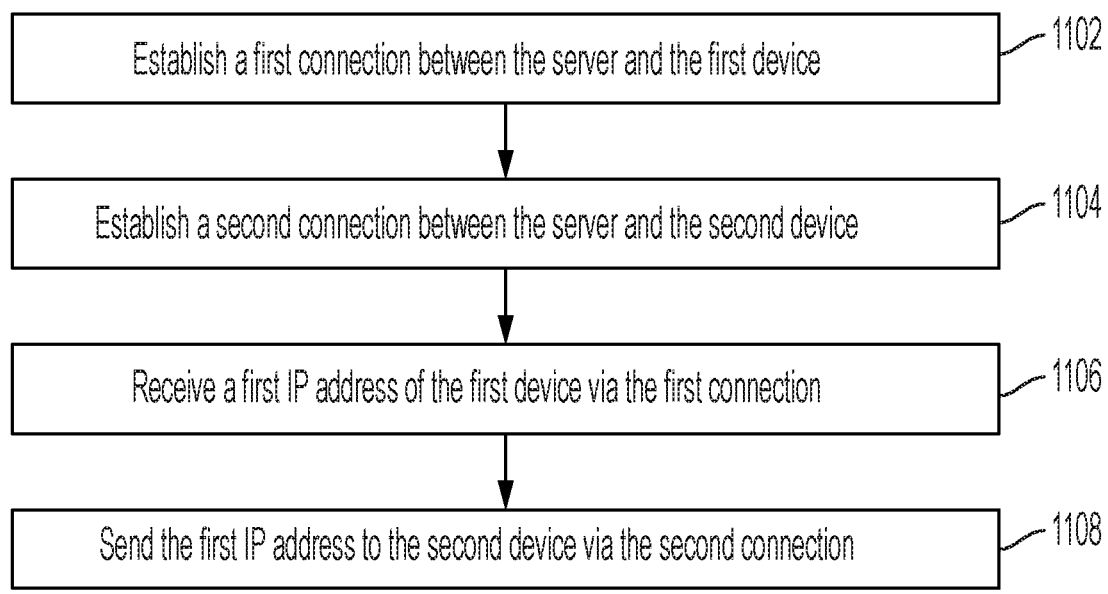
FIG. 11 is a flow chart illustrating an embodiment of a process implemented on a server for establishing a peer-to-peer connection between two user devices.

FIGS. 11, 12, 13, and 14 illustrate exemplary methods and apparatus for facilitating establishment of a private group chat session among user devices. FIG. 11 is a flowchart illustrating a method 1100 for establishing a peer-to-peer connection between two user devices 202. Establishing a peer-to-peer connection between two user devices is a first step of building a group chat session between the two or among a plurality of user devices.

In FIG. 11, a first connection between the server 206 and the first device 202 is established (step 1102). A second connection between the server 206 and the second device 202 is also established (step 1104). The server receives the IP address (a first IP address) of the first device 202 via the first connection (step 1106) and sends the first IP address to the second device 202 via the second connection (step 1108).

Figure 12:
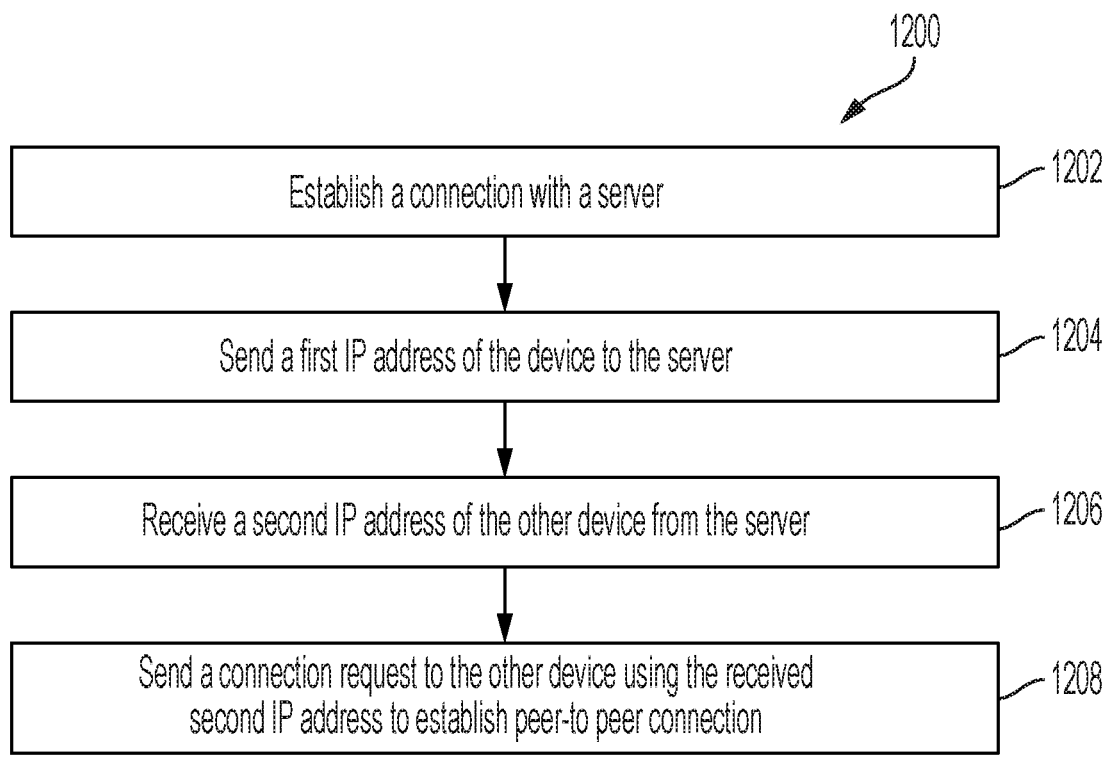
FIG. 12 is a flow chart illustrating an embodiment of a process implemented on an end user for establishing a peer-to-peer connection with another user device.

FIG. 12 is a flow chart illustrating a counterpart user device method 1200 of the method 1100 illustrated in FIG. 11. In step 1202, a user device 202 first establishes a connection with a server 206. Over the established connection, the user device 202 sends a first IP address, i.e., its dynamic IP address to the server 206 (step 1204). The user device 202 then receives a second IP address, i.e., the dynamic IP address of another user device 202, from the server 206 (step 1206). The user device 202 uses the received IP address to send a connection request to the other device 202 to establish peer-to-peer connection (step 1208).

Figure 13:
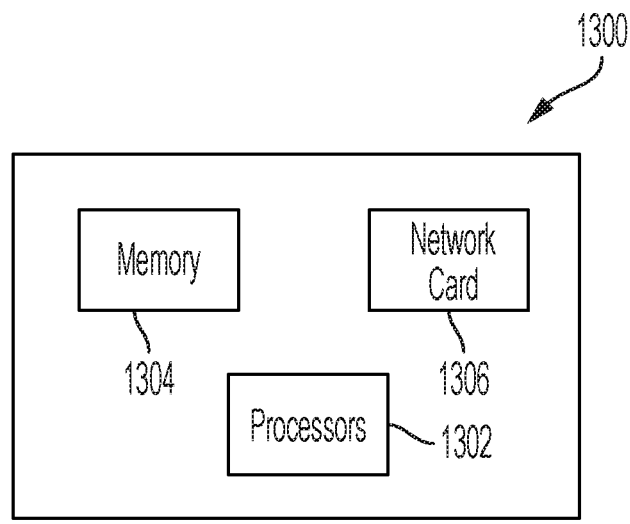
FIG. 13 illustrates an embodiment of a server configured to establish peer-to-peer connections in accordance with the disclosures herein.

FIG. 13 is a block diagram illustrating an exemplary server 1300 configured to facilitate establishment of a peer-to-peer connection between two user devices. The server 1300 comprises one or more processors 1302, a memory 1304, and a network card 1306. The network card 1306 is configured to transmit and receive data to and from user devices. In one embodiment, the data is transmitted over an IP connection, for example, TCP and/or UDP connection. However, other types of network connections are feasible. The memory 1304 is configured to store data and processor instructions. The instructions, when executed, causes the processors 1302 to carry out the group chat establishment methods described herein.

Figure 14:
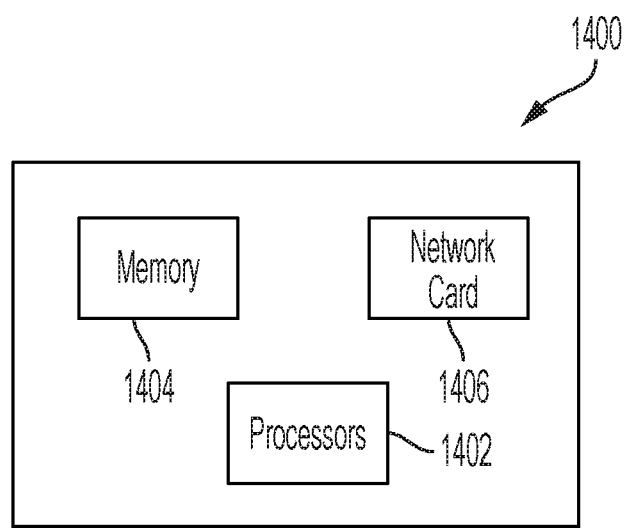
FIG. 14 illustrates an embodiment of an end user device configured to establish peer-to-peer connections with other end user devices in accordance with the disclosures herein.

FIG. 14 is a block diagram illustrating an exemplary user device 1400 configured to establish a peer-to-peer connection with another user device. The exemplary user device 1400 comprises one or more processors 1402, a memory 1404, and a network card 1406. The network card 1306 is configured to transmit and receive data to and from a server and also to and from other user devices over network connections. The network connections may be over ethernet, wireless, BlueTooth, etc. and the network connections may be TCP and/or UDP or other types of connections. The memory 1404 is configured to store data and software programs. The software programs, when executed by the processors 1402, implement the various methods described herein.

The methods and apparatus disclosed in the present application can be implemented using software or hardware or a combination of software and hardware.

What is claimed is:

1. A method of facilitating, by a server, establishment of a peer-to-peer connection between a first device and a second device, said method comprising:
   establishing a first connection between the server and the first device;
   establishing a second connection between the server and the second device;
   receiving, by the server, a request from the second device for a first IP address of the first device;
   forwarding the request from the second device to the first device;
   receiving from the first device an approval of the request of the second device:
   sending the first IP address of the first device to the second device via the second connection; wherein the first IP address of the first device is used by the second device to establish a first peer-to-peer connection between the first device and the second device;
   receiving a request to disconnect from the first device or the second device, wherein the request to disconnect is sent by the first device or the second device to disconnect the first connection or the second connection respectively;
   and
   disconnecting both the first connection and the second connection after receiving the request to disconnect;
   wherein the sending of the first IP address to the second device via the second connection comprises sending the first IP address of the first device to the second device in response to a request from the second device.

2. The method of claim 1, wherein the first IP address of the first device comprises a dynamic IP address of the first device and a port number of the dynamic IP address.

3. The method of claim 2, wherein the first connection is a TCP connection.

4. The method of claim 3, further comprising establishing a UDP connection between the first device and the server in addition to the TCP connection.

5. The method of claim 2, wherein the first connection is a UDP connection.

6. The method of claim 1, wherein the request from the second device comprises a request from the second device of making a peer-to-peer connection with the first device or a request from the second device for the first IP address of the first device.

7. The method of claim 1, further comprising:
   receiving a second IP address of the second device via the second connection;
   sending the second IP address to the first device via the first connection.

8. The method of claim 7, further comprising:
   establishing a third connection between the server and a third device; and
   receiving a third IP address of the third device via the third connection.

9. The method of claim 8, wherein the first, second, and third IP addresses are sent, by the server, to each of the first, second, and third devices to allow each of the devices to establish a peer-to-peer connection with another device.

10. The method of claim 7, further comprising:
    receiving an indication of the first peer-to-peer connection between the first device and the second device; and
    sending the first peer-to-peer connection to other devices to allow the other devices to join.

11. A server configured to facilitate establishing a peer-to-peer connection between a first device and a second device, said server comprising:
    one or more processors;
    a network communication device configured to transmit and receive data over an IP network;
    wherein the one or more processors are configured to:
    establish a first connection between the server and the first device;
    establish a second connection between the server and the second device;
    receiving, by the server, a request from the second device for a first IP address of the first device;
    forwarding the request from the second device to the first device;
    receiving from the first device an approval of the request of the second device:
    receive a first IP address of the first device via the first connection;
    send the first IP address to the second device via the second connection in response to a request from the second device, wherein the first IP address of the first device is used by the second device to establish a peer-to-peer connection between the first device and the second device;
    receiving a request to disconnect from the first device or the second device, wherein the request to disconnect is sent by the first device or the second device;
    and
    disconnect both the first connection and the second connection after receiving the request to disconnect.

12. The server of claim 11, wherein the first IP address of the first device comprises a dynamic IP address of the first device and a port number of the dynamic IP address.

13. The server of claim 12, wherein the first connection is a TCP connection.

14. The server of claim 12, wherein the first connection is a UDP connection.

15. The server of claim 13, wherein the one or more processors are further configured to establish a UDP connection between the first device and the server in addition to the TCP connection.

16. The server of claim 11, wherein the request from the second device comprises a request from the second device of making a peer-to-peer connection with the first device or a request from the second device for the first IP address of the first device.

17. The server of claim 11, wherein the one or more processors are further configured to:
    receive a second IP address of the second device via the second connection;
    send the second IP address to the first device via the first connection.

18. The server of claim 17, wherein the one or more processors are further configured to:
    establish a third connection between the server and a third device; and
    receive a third IP address of the third device via the third connection.

19. The server of claim 17, wherein the one or more processors are further configured to:
    receive an indication of the peer-to-peer connection between the first device and the second device; and
    send the peer-to-peer connection to other devices to allow the other devices to join.

20. The server of claim 18, wherein the first, second, and third IP addresses are sent, by the server, to each of the first, second, and third devices to allow each of the devices to establish a peer-to-peer connection with another device.

21. An end device configured to establish a peer-to-peer connection with another device, said end device comprises:
   one or more processors; and
   a network communication card for transmitting and receiving data over an IP network;
   wherein the one or more processors are configured to:
   establish a connection with a server;
   send a first IP address of the end device to the server;
   request a second IP address of the other device from the server;
   receive the second IP address of the other device from the server;
   send a connection request to the other device using the received second IP address to establish a peer-to-peer connection;
   send a disconnect request to the server to disconnect the connection between the end device and the server;
   establish the peer-to-peer connection between the end device and the other device to form a private chat session, wherein the end device and the other device send and receive private communication data over the peer-to-peer connection and the private communication data does not go through the server; and
   exchange keep-alive messages on the peer-to-peer connection with the second device to monitor a status of the peer-to-peer connection.

22. The end device of claim 21, wherein the one or more processors are further configured to:
   receive a third IP address of a third device from the server; and
   send a connection request to the third device using the received third IP address.

23. The end device of claim 21, wherein the one or more processors are further configured to send an indication of the established peer-to-peer connection to other devices.

24. The end device of claim 21, wherein the one or more processors are further configured to:
   receive an indication of a peer-to-peer connection between two other devices; and
   send a connection request to one of the two other devices to form a group chat session.

25. A method of establishing, by a first device, a peer-to-peer connection between the first device and a second device, said method comprising:
   establishing a connection with a server;
   sending a first IP address of the first device to the server;
   requesting a second IP address of the second device from the server;
   receiving the second IP address of the second device from the server;
   sending a connection request to the second device using the received second IP address to establish a peer-to-peer connection;
   sending a disconnect request to the server to disconnect the connection between the first device and the server;
   establish the peer-to-peer connection between the end device and the other device to form a private chat session, wherein the end device and the other device send and receive private communication data over the peer-to-peer connection and the private communication data does not go through the server; and
   exchanging keep-alive messages on the peer-to-peer connection with the second device to monitor a status of the peer-to-peer connection.

26. The method of claim 25, further comprising:
   receiving a third IP address of a third device from the server; and
   sending a connection request to the third device using the received third IP address.

27. The method of claim 25, further comprising sending an indication of the established peer-to-peer connection to other devices.

28. The method of claim 25, further comprising:
   receiving an indication of a peer-to-peer connection between two other devices; and
   sending a connection request to one of the two other devices to form a group chat session.

* * * * *